Figure 1:
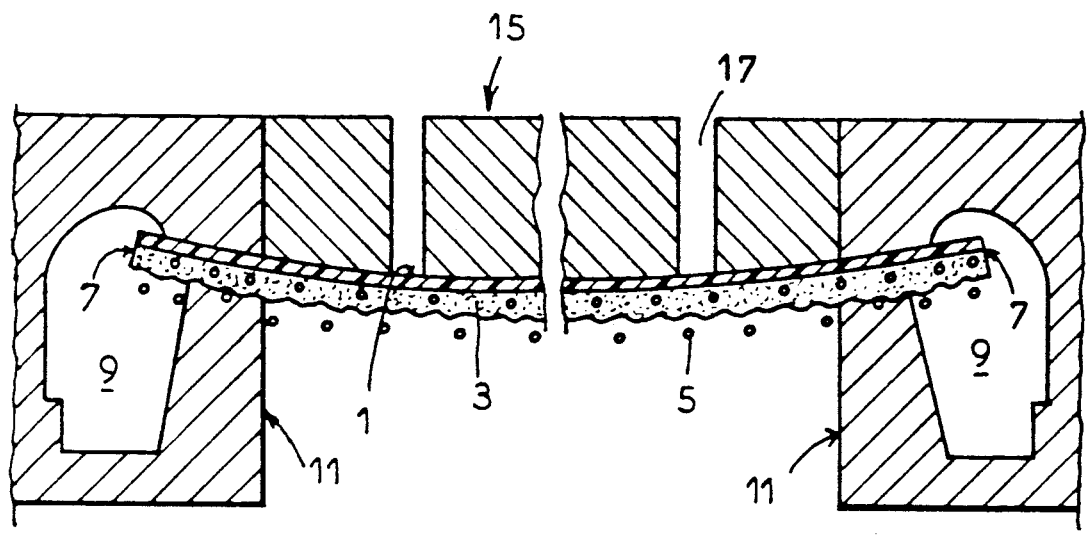

United States Patent

Danton

[11] Patent Number: 5,116,556
[45] Date of Patent: May 26, 1992

[54] PROCESS FOR MOLDING A FRAME ONTO A SEAT OUTFIT FOR THE PURPOSE OF PRODUCING A SEAL ELEMENT

[75] Inventor: Jean-Louis Danton, Boulogne, France

[73] Assignee: Etablissements M. Duret et Fils, Brionne, France

[21] Appl. No.: 582,981

[22] Filed: Sep. 13, 1990

Related U.S. Application Data

[63] Continuation of Ser. No. 249,574, Sep. 26, 1988, abandoned.

Foreign Application Priority Data

Sep. 24, 1989 [FR] France .................. 87 13199

[51] Int. Cl.⁵ ............................................. B29C 67/22
[52] U.S. Cl. ............................ 264/464; 264/46.7; 264/252; 264/271.1
[58] Field of Search .......... 264/252, 328.1, 46.4, 264/46.5, 46.7, DIG. 83, 271.1

[56] References Cited

U.S. PATENT DOCUMENTS

| Re. 24,914 | 12/1960 | Koenigsberg | 264/46.5 |
|---|---|---|---|
| 2,785,440 | 3/1957 | Toulmin, Jr. | 264/46.4 |
| 3,116,196 | 12/1963 | Terry | 264/46.7 |
| 3,855,653 | 12/1974 | Stalter, Sr. | 5/478 |
| 4,106,139 | 8/1978 | Southard | 5/481 |
| 4,154,786 | 5/1979 | Plasse | 264/46.7 |
| 4,311,541 | 1/1982 | Fultz | 264/46.4 |
| 4,423,102 | 12/1983 | Danton | 428/92 |
| 4,492,663 | 1/1985 | Reinfeld et al. | 264/46.4 |
| 4,640,150 | 2/1987 | Kobayashi et al. | 264/DIG. 83 |
| 4,795,517 | 1/1989 | Elliot et al. | 29/91.1 |
| 5,000,983 | 3/1991 | West et al. | 264/46.9 |

FOREIGN PATENT DOCUMENTS

| 0100276 | 2/1984 | European Pat. Off. | |
| 48-001556 | 1/1973 | Japan | 264/46.5 |
| 7409698 | 1/1975 | Netherlands | 264/DIG. 83 |
| 994021 | 6/1965 | United Kingdom | 264/46.7 |

*Primary Examiner*—Robert A. Dawson
*Assistant Examiner*—Allan R. Kuhns
*Attorney, Agent, or Firm*—Scully, Scott, Murphy & Presser

[57] ABSTRACT

A process for producing a seat element from a portion of an outfit (1) including a relatively compact plastic covering layer, a network formed by a continuous sheet of metal springs (5), the intermingled turns of which, on one side, come substantially flush against the lower face of the covering (1), and an intermediate connecting layer (3) made of a plastic foam which partially encases the turns of the sheet of springs (5).

According to the invention, the peripheral edge (7) of the said outfit portion is gripped in an injection mold (11), this mold having a cavity (9) into which the said edge (7) penetrates, a thermoplastic to which an expanding agent has been added is injected into the said cavity at low pressure, and this thermoplastic is allowed to harden there.

3 Claims, 1 Drawing Sheet

PROCESS FOR MOLDING A FRAME ONTO A SEAT OUTFIT FOR THE PURPOSE OF PRODUCING A SEAL ELEMENT

This application is a continuation of application Ser. No. 249,574, filed on Sep. 26, 1988 now abandoned.

The present invention relates to a process for molding a frame onto a seat outfit for the purpose of producing a seat element.

This process is intended more particularly to be used for seat outfits which are the subject of French Patent No. 2,447,167 belonging to the Applicant.

It is recalled that these outfits are composed essentially of three elements:

1) A compact and relatively thick plastic covering layer which, because of its thickness and compactness, provides a first obstacle to laceration. This covering layer, which is not subjected to any tensile force whatever, has low elasticity in its plane, but high flexibility.

2) A network formed from a continuous sheet of spiral (helical) metal springs, the axes of which are parallel to the compact plastic covering layer, and the turns of which are intermingled with one another, so as to obtain, as seen in a plan view, a checkered structure with meshes of very low extensibility, making it possible to stop the penetration and advance of a cutting article (the springs being incapable of moving apart to allow the said article to pass through), the turns of the said springs, on one side, coming substantially flush against the lower face of the covering layer.

3) An intermediate connecting layer between the covering layer and the sheet of springs, this layer being produced from a plastic foam of a thickness less than the diameter of the turns of the springs of the sheet and, on one side, adhering to the lower face of the compact plastic covering layer and partially encasing the turns of the sheet of springs (over a fraction of the thickness of the sheet of springs).

This outfit is intended for equipping seats for public transport and other public places, and its aim is to limit acts of vandalism by opposing the lacerations of the seats.

Insofar as the springs with which it is equipped are embedded only partially in the intermediate connecting layer, the fastening of a rigid frame to the periphery of a portion of such an outfit in order to produce a seat element presents various problems. In particular, if a plastic is to be molded onto the periphery of the outfit to form a frame, the molding operations are complicated by the presence of the turns of these springs in the surface of the intermediate layer.

To overcome this disadvantage, the Applicant, in European Patent No. 100,276, provided an original process for producing such a seat element. This process involves the following operations:

The cutting of the outfit,

The laying of a plastic bead having properties of elasticity at a short distance from the peripheral edge on the side where the sheet of springs emerges, this bead adhering to the plastic foam intermediate layer and encasing, by extending beyond it, that part of the sheet of springs projecting from the said intermediate layer, this bead being intended to serve as a sealing element during the molding of the rigid frame, The insertion of the peripheral edge of the outfit into the cavity of a peripheral mold, the sealing between the outfit and the mold being ensured, on one side, by the contact of the wall of the mold with the outer face of the outfit and, on the other side, by the contact of the wall of the mold on the sealing bead, and The pouring or injection of a suitably selected plastic into the mold in order to produce a rigid frame on the periphery of the outfit.

This process proves highly effective, but it is complicated by the need to embed the turns of the springs emerging from the intermediate layer in a plastic bead which serves as a sealing element during the molding of the rigid frame.

The object of the present invention is to simplify this process by eliminating the phase of producing a sealing bead before the operation of molding the frame.

In fact, the Applicant found that by utilizing appropriate conditions for the injection of a thermoplastic, it is possible to produce a frame molded on the periphery of an outfit element of the abovementioned type, without previously having to produce a plastic bead ensuring sealing in the region of the mold.

The subject of the present invention is, therefore, a process for producing a seat element or the like from a portion of desired shape of an outfit comprising, at least, a relatively compact plastic covering layer, a network formed by a continuous sheet of spiral metal springs, the axes of which are parallel to the covering layer and the intermingled turns of which, on one side, come substantially flush against the lower face of the covering, and an intermediate connecting layer between the covering layer and the sheet of springs, this layer being produced from a plastic foam adhering to the lower face of the covering layer on one side and partially encasing the turns of the sheet of springs, this process being defined in that the peripheral edge of the said outfit portion is gripped in an injection mold, this mold having a cavity into which the edge penetrates, in that a thermoplastic to which an expanding agent is added is injected into the cavity at low pressure, and in that this thermoplastic is allowed to harden there.

The injection pressure of the expandable thermoplastic into the mold will vary between 80 and $250 \times 10^5$ pascals (or between 80 and 250 bars), depending on the type of this material. All expandable thermoplastics can be used within the scope of the present invention. Mention will be made, for example, of polycarbonates, polyarylamides and polypropylenes, this list of course not being limiting.

When the edge of the outfit is gripped by means of the injection mold, the springs are consequently compressed between the plastic foam intermediate layer and the jaws of the mold, thus ensuring a primary sealing in the region of the mold. However, since the intermediate layer is flexible and compressible, it is necessary, on the one hand, to carry out the injection of thermoplastic at low pressure and, on the other hand, to compensate by the expansion of this thermoplastic the compression experienced by the foam of the intermediate layer.

The injection temperatures and cycles are those of thermoplastics to which a suitable expanding agent used has been added.

The Table below gives some of these characteristics by way of example.

TABLE

| Thermoplastic resin | Poly-carbonate | Polyarylamide | Polypropylene |
|---|---|---|---|
| Injection temperature | 270 to 300° C. | 250° C. to 270° C. | 210° C. to 240° C. |

TABLE-continued

| Thermoplastic resin | Polycarbonate | Polyarylamide | Polypropylene |
| --- | --- | --- | --- |
| Injection pressure in the mold (in $10^5$ pascals) | 250 | 200 | 80 |
| Injection time | 4 to 5 seconds | 3 to 4 seconds | 2 to 3 seconds |
| Temperature of the mold | 50° C. | 40° C. | 30° C. |
| Cooling time | 1 minute 30 seconds | 1 minute 30 seconds | 2 minutes |

Where the abovementioned plastics are concerned, the expanding agent used can be any of the products marketed under the brand names of EXPANDEX, GENITRON and EXPANSOR (registered trademarks).

Advantageously, as described in more detail in European Patent No. 100,276, it is possible, during the phase of installation of the mold and of molding, to impart a stress to the outfit in order to give it a curved shaped which it preserves after the plastic forming the frame has solidified.

Figure 2:
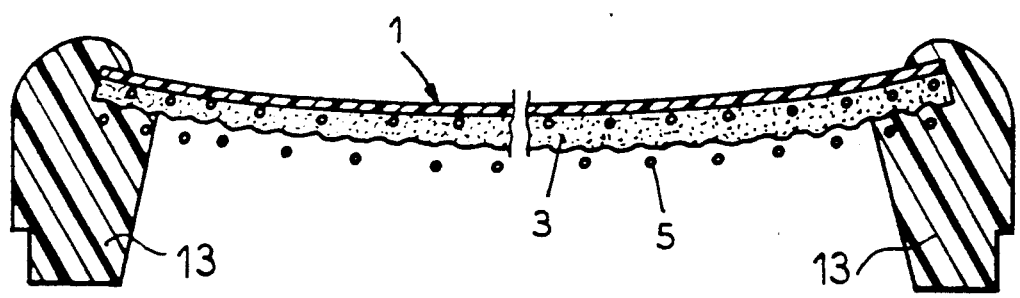

The accompanying diagrammatic drawings illustrate how the invention is put into practice. In these drawings:

FIG. 1 is a section showing the gripping of the peripheral edge of the outfit in an injection mold; and FIG. 2 is a section through the seat element obtained after the molding of the frame.

As illustrated in the drawings, the outfit element, cut to the desired shape and dimensions, comprises a covering layer 1 made of compact plastic, such as silicone elastomers, polyethylene and compact polyvinyl chloride, for example of a density of the order of 1.18 to 1.30 and of a Shore hardness of 40 to 98, this covering layer 1 being relatively thick, for example of the order of 2 mm.

The lower face of this covering layer 1 is fixed by means of an intermediate layer 3 of plastic foam to a network formed by a continuous sheet of helical metal springs 5 with axes parallel to one another and to the covering layer 1.

The turns of these springs 5 are intermingled with one another, as described above, and on one side are flush against the lower face of the covering layer 1.

These springs 5 can be produced, for example, by means of steel wires of a diameter of the order of 0.5 to 1.5 mm. The diameter of the turns can then be between 5 and 20 mm.

The intermediate layer 3 can be produced from plastic foam (polyvinyl chloride, silicones, polyethylene) of a density which can vary, for example, from 1 to 1.25.

The thickness of this intermediate layer 3 is equal to ¼ to ½ of the diameter of the turns of the springs 5, so that the turns are only partially encased in the plastic foam.

That part of these turns which emerges from the intermediate layer 3 of course complicates the production of a frame by the molding of a plastic onto the periphery of the outfit element, in order to obtain a seat element, since the springs 5 oppose the closing of the molds used with satisfactory sealing.

To achieve this, according to the invention the peripheral edge 7 of the outfit element is engaged into the cavity 9 of an injection mold 11, this cavity 9 having a cross-section corresponding to that of the frame 13 which is to be produced. The edge 7 of the outfit is gripped in the jaws of the mold 11, so as to compress the contiguous turns of the springs 5 against the intermediate layer 3 and ensure semi-sealing in the region of the jaws.

Simultaneously, the outfit is curved by keeping it laid via its covering 1 against a die 15 of the desired shape in which ducts 17 connected to a vacuum pump (not shown) make it possible to exert suction on the outfit.

In this position, a thermoplastic resin to which an expanding agent has been added is injected into the cavity 9 of the mold at low pressure, in such a way that the deformation of the intermediate layer resulting from the pressure exerted is limited and compensated by the expansion of the injected material, without impairing the sealing of the mold.

The plastic thus encases the peripheral edge 7 of the outfit element, including the projecting part of the sheet of springs, thus ensuring an excellent anchorage of the frame 13 thus produced.

After the injected plastic has solidified and the frame 13 has been removed from the mold, the seat element illustrated in FIG. 2 is obtained, in which the outfit preserves the prestressed shaped given to it by the die 15.

The process according to the invention is therefore much easier to carry out than that of the prior art described in European Patent No. 100,276.

I claim:

1. A process for producing a seat element from an outfit of desired shape, said outfit having at least a relatively compact plastic covering layer, a network of continuous spiral metal springs having axes parallel with the covering layer, said network of springs having intermingled turns which are substantially flush against a lower face of the covering and cover essentially the entire surface thereof, an intermediate plastic foam connecting layer between the covering layer and the network of springs adhering to the lower face of the covering layer and partially incasing the turns of the network of springs adjacent said covering layer; said process comprising the steps of:

gripping a peripheral edge portion of said outfit in a cavity of an injection mold, said mold having meting jaw portions of which one said jaw portion contacts an upper face of said covering and the other jaw portion contacts the network of springs and the plastic foam connecting layer in clamping engagement, thereby sealing said cavity without interposing a sealing bead between said jaw portions;

simultaneously applying a stress force to the surface of said outfit and imparting a predetermined curvature to the surface of said outfit in the region of said surface intermediate the peripheral confines of said edge portion concurrently with the gripping application of said mold to said peripheral edge portion;

injecting an expandable thermoplastic material to which an expanding agent has been added into said mold cavity;

allowing said expandable thermoplastic to expand and harden about said peripheral edge of said outfit and to bond therewith in said cavity of said mold while maintaining said portion of the outfit between said edge portion in contact with said curvature-imparting mold portion; and removing said seat element formed from said outfit from said mold whereby the expanded and hardened thermoplastic material engaging the peripheral edge portion of the seat element maintains the shaped curvature thereof.

2. A process as claimed in claim 1, wherein the injection pressure of the expandable thermoplastic is between 80 and 250 × $10^5$ pascals.

3. A process as claimed in claim 1 wherein said expandable thermoplastic is selected from the group consisting of polycarbonates, polyarylamides and polypropylenes.

* * * * *

UNITED STATES PATENT AND TRADEMARK OFFICE
CERTIFICATE OF CORRECTION

PATENT NO. : 5,116,556

DATED : May 26, 1992

INVENTOR(S) : Jean-Louis Danton

It is certified that error appears in the above-identified patent and that said Letters Patent is hereby corrected as shown below:

On title page, item, Section [30]: "Sep. 24, 1989" should read as --Sep. 24, 1987--

Signed and Sealed this

Fourteenth Day of September, 1993

Attest:

BRUCE LEHMAN

*Attesting Officer*  *Commissioner of Patents and Trademarks*